United States Patent

Petersen

[15] 3,690,168
[45] Sept. 12, 1972

[54] FOUR SQUARE TEST DEVICE WITH TORQUE STABILIZATION

[72] Inventor: Niel R. Petersen, Hopkins, Minn.

[73] Assignee: MTS Systems Corporation, Minneapolis, Minn.

[22] Filed: Dec. 31, 1970

[21] Appl. No.: 103,063

[52] U.S. Cl. ..................................... 73/162, 73/99
[51] Int. Cl. ............................................. G01m 13/02
[58] Field of Search .................................. 73/99, 162

[56] References Cited

UNITED STATES PATENTS 3,112,643   12/1963   Lanahan ..................... 73/99 X
2,935,869   5/1960    Shipley ..................... 73/162 X
2,981,103   4/1961    Livezey ..................... 73/162

Primary Examiner—Jerry W. Myracle
Attorney—Dugger, Peterson, Johnson & Westman

[57] ABSTRACT

A test device using the "four square" principal of testing specimens which permits input of dynamic torque changes and being arranged to eliminate the inertia effects of the mass of connecting gears or mechanisms between the parallel members of the four square test device.

12 Claims, 4 Drawing Figures

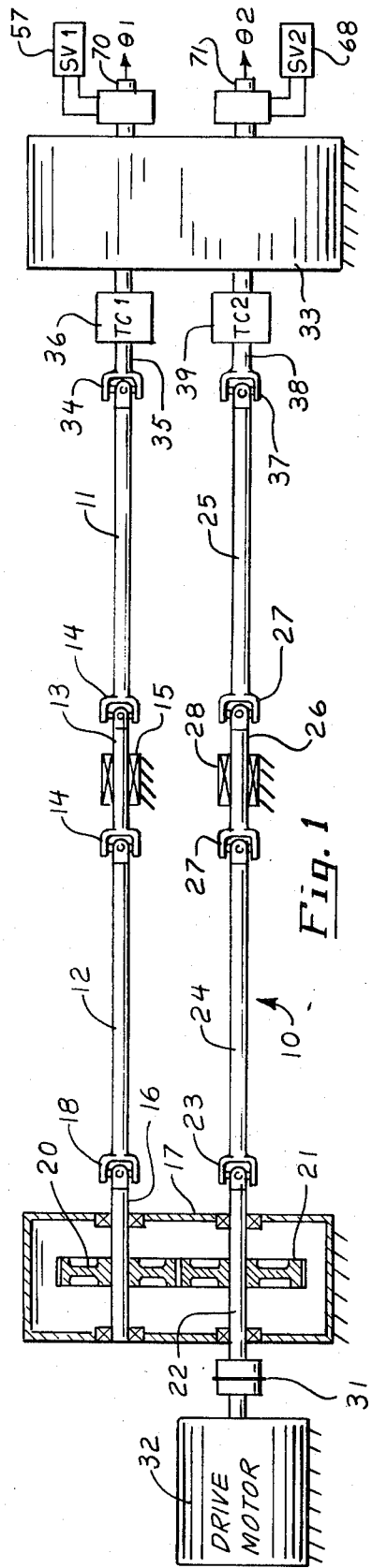
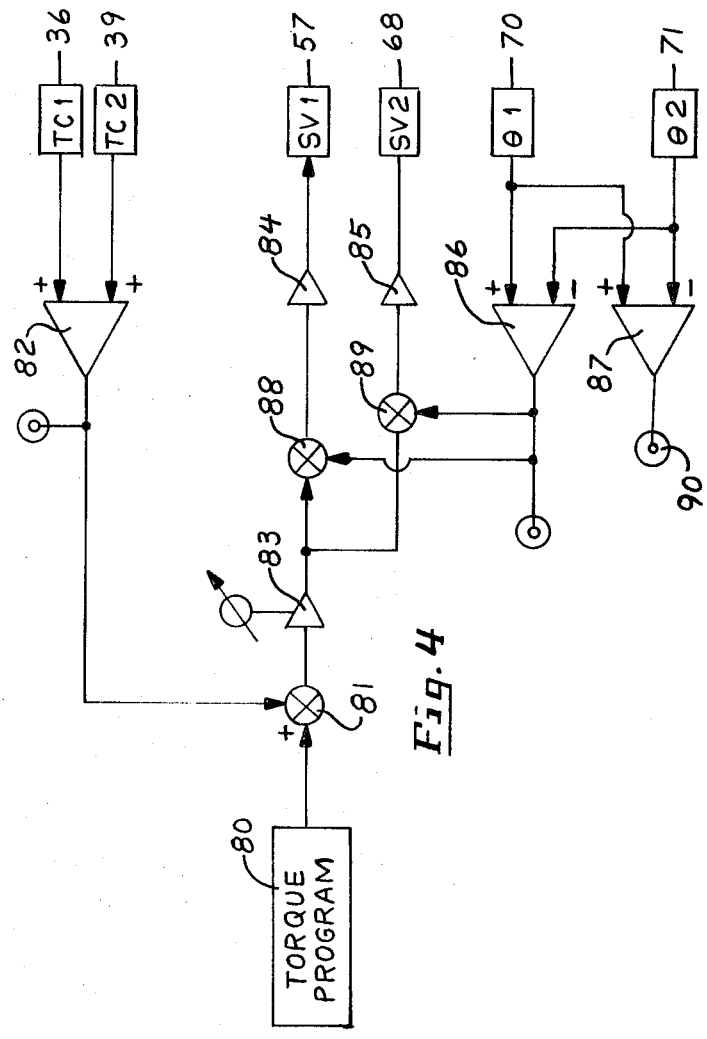

INVENTOR.
NIEL R. PETERSEN
BY
Dugger, Peterson, Johnson, & Westman

FOUR SQUARE TEST DEVICE WITH TORQUE STABILIZATION

BACKGROUND OF THE INVENTION

1. Field of the Invention

The present invention relates to testing devices utilizing the four square principle and wherein dynamic torque input on the test speciman can be provided without introducing undesirable inertia effects.

2. Prior Art

Four square test devices are commonly known, and comprise a system where generally four substantially identical specimens, usually shafts or axles, are tested in a system. The shafts are connected into pairs, and each pair comprises two shafts connected in series with universal joints or the like, and mounted on suitable bearings. The pairs of shafts are arranged in side by side relationship, and have first and second ends. At their ends, one pair of shafts is connected to the other pair with chains or gears so that the shafts can be torque loaded against each other. The torque in one pair of shafts is opposed by the torque in the other pair of shafts through the gears. Then the shafts are driven at one end with a motor. The amount of torque in the shafts of course depends upon the position of the gears.

It is also known to introduce dynamic torques into this type of test system through the use of an actuator acting on one of the sides of the system only, and this increase or decrease in torque had to act through the connecting gears on the opposite end of the series coupled specimen to be transmitted into the parallel specimens. The connecting devices have a mass, and when large gears are used for connecting the specimen, the mass of the gears cause inertia load problems and may be excited into resonance, causing undesirable oscillation of the entire test system. Therefore peak loads or torques are applied that are not the proper torques for the program being used with the tested device.

SUMMARY OF THE INVENTION

The present invention relates to a four-square test device that permits the introduction of dynamic torques without having the systems subjected to resonant or inertia loads. The system comprises at least two specimen sets and the use of dual hydraulic actuators, one on each of the specimen sets so that changes in torque is simultaneously made through each of the actuators to therefore eliminate the transmission of this increase of torque through gears or chains at the opposite end of the specimen sets. This introduction of torque can be done quickly with vane type hydraulic actuators controlled with servo valves, and additional indicators can be used to indicate the relative angular position of the two actuators to make sure that the actuators do not bottom out.

In addition, this system utilizes load cells for indicating the actual torque being introduced into the specimens, and the actual torque signal from the load cells can be compared with the preset program to make instantaneous torque adjustments. The advantage is that the inertia of the connecting gears at opposite ends of the specimen sets from the hydraulic actuators is not coupled into the test system and therefore cannot subject the system to dynamic inertia effects, which previously have limited the programming of the test devices insofar as dynamic torque changes are concerned.

BRIEF DESCRIPTION OF THE DRAWINGS

FIG. 1 is a schematic representation of a dynamic torque applying four square test device made according to the present invention;

FIG. 4 is a schematic representation of the test circuit and controls used with the present invention.

DESCRIPTION OF THE PREFERRED EMBODIMENT

Figure 2:
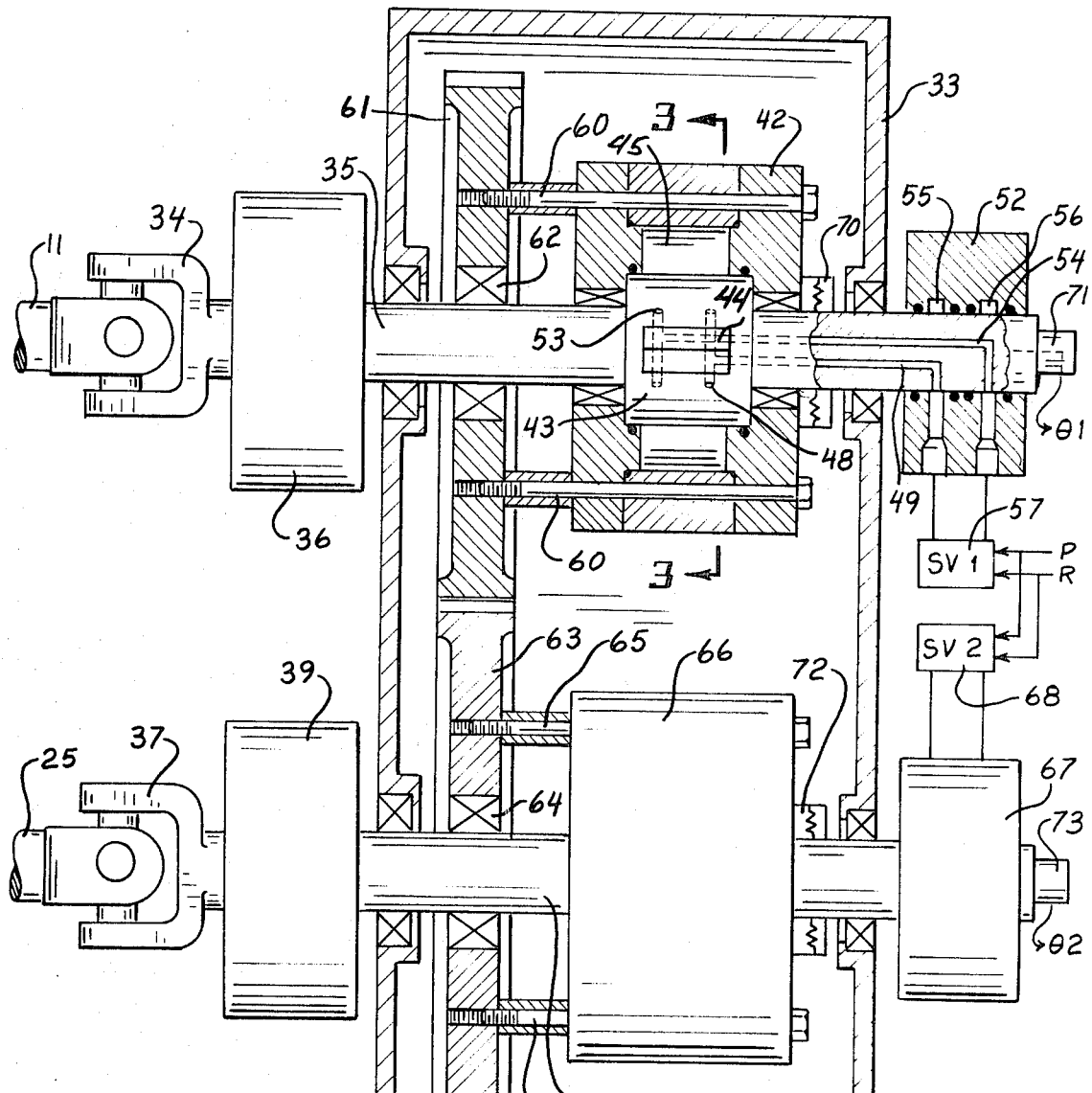
FIG. 2 is a sectional view through the center of the torque input end of the four square test device showing the details of the typical hydraulic actuator used with the present invention.

Referring to FIG. 1 in particular, a four square test device illustrated generally at 10 comprises a first specimen 11, and a second specimen 12, which are coupled together in series with a suitable connecting shaft 13 through universal joints 14. The shaft 13 is supported with a bearing 15. These two shafts or specimens 11 and 12 could be any test shafts, such as propeller shafts for automobiles, axles for automobiles or the like.

The first and second specimens, 11 and 12, comprise a series connected pair of specimens forming a specimen set in a four square testing device. The input ends are adjacent the outer end of the first specimen 11, and the end of specimen 12 opposite from universal joint 14 is connected through a universal joint 18 to a shaft 16 that is rotatably mounted on suitable bearings in a housing 17 which is supported in a test frame or on a block. The shaft 16 has a first spur gear 20 drivably mounted thereon, and this first gear 20 engages a second spur gear 21 that is in turn drivably mounted onto a shaft 22 also rotatably mounted in the housing 17. The shaft 22, is connected through a universal joint 23 to a third specimen 24, that comprises a specimen in series with a fourth specimen 25. The specimens 24 and 25 comprise a specimen set.

The third and fourth specimens 24 and 25 are connected in series with a shaft 26 and universal joints 27 at opposite ends of the shaft 26. The shaft 26 is also rotatably mounted on a bearing assembly 28 that is in the center of the shaft 26 and that corresponds to bearing 15.

A drive coupling 31 is provided on the outer end of shaft 22, and an electric drive motor of usual design indicated at 32 is utilized for driving the specimens. The shafts 11 and 12 are parallel to shafts 24 and 25.

At the opposite end of the unit from housing 17, there is a housing 33. Between the housing 33 and specimen 11 there is a universal joint 34, and a shaft 35 having a torque cell 36 mounted therein. The torque cell 36 is of usual design which will measure the torque being transmitted by the shaft 35, and consequently the specimens 11 and 12, and the cell will deliver electrical signals proportional to the amount of torque in the shaft 35 through suitable slip rings, conventionally known and used.

In addition, the specimen 25 has a universal joint 37 connected thereto, which is in turn connected to a shaft 38 in which a second torque cell 39 is mounted. Torque cell 39 is used to measure or monitor the torque in shaft 38.

Referring to FIG. 2, it can be seen that the housing 33 has bearings which support the shafts 35 and 38 so that the shafts are rotatably held in place. The housing 33 is schematically shown to be supported in a test stand or the like. The unit can all be mounted onto a common frame so that the housings 17 and 33 are in the common frame.

At this end of the test device, the amount of torque in the specimens 11 and 12, and in the specimens 24 and 25 is controlled through the use of two rotary hydraulic actuators. The parallel shafts are coupled together with drive gears so they can be rotated at varying speeds and torques. As shown, the shaft 35, which is coupled to the specimens 11 and 12, has a vane type hydraulic actuator 42 mounted thereon inside the housing 33, and this actuator 42 has an outer housing that is rotatably mounted on the shaft 35. The shaft 35 has an integral enlarged portion 43 on which vanes 44 are fixedly mounted, and these mate with internal vanes 45 on the interior of the housing 42. Vanes 44 and 45 together form four chambers, namely chambers 46A and 46B, and 47A and 47B. The chambers 46A and 46B are connected with a cross passage 48 in shaft 35 that in turn opens to an outwardly extending passage 49, that extends outwardly along the shaft 35 past the outboard bearing of the housing 33. The passage 49 has a right angle turn so the passage opens to the outer surface of the shaft and to an annular chamber 55 defined in the interior of a hydraulic commutator 52.

Likewise, chambers 47A and 47B are connected with a cross passageway 53 in shaft 35 that opens into a passageway 54 extending outwardly along the shaft 35, and then opening into a second chamber 56 in the hydraulic commutator 52. The hydraulic commutator 52 has, as shown, the chambers 55 and 56 that align with the passageways 49 and 54 as shown, and the hydraulic commutator supplies fluid under pressure from a first servo valve 57 so that the amount of pressure in the chambers 46A and B or 47A and B can be changed. The amount of pressure therefore controls the angular movement between the vanes 44 and 45. The outer housing 42 is connected with suitable long bolts or similar connecting devices shown at 60 to a first gear 61 that is rotatably mounted on a suitable bearing 62 to the shaft 35 the teeth of the gear 61 engage the teeth of a gear 63 that is also rotatably mounted with a bearing 64 on the shaft 38. The shaft 38 is connected to specimens 24 and 25.

Figure 3:
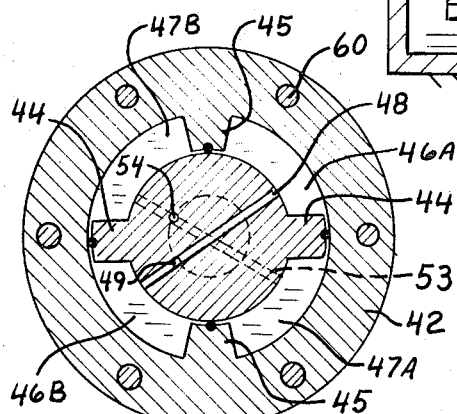
FIG. 3 is a sectional view taken as on line 3—3 in FIG. 2.

The gear 63 is connected with suitable bolts or connecting devices 65 to a second rotary hydraulic actuator 66 that is constructed identically to the actuator 42, and the shaft 38 also has the vanes and chambers that are illustratively shown in FIG. 3 in connection with the hydraulic actuator 42. The actuator 66 is also a vane type hydraulic actuator supplied with pressure through a rotary hydraulic commutator 67 at the outer end of the shaft 38. The commutator 67 is connected to a second servo valve 68 that also receives fluid under pressure from the same source as servo valve 57. The outer portion of the commutators remain stationary while the shafts rotate.

Thus it can be seen that the amount of torque in the specimens 11, 12 and 24, 25, can be controlled by the amount of deflection between the vanes 44 and 45 of each of the hydraulic actuators 42 and 66. The amount of torque that is being transmitted through the actuators can be controlled by the respective servo valves 57 and 68 in response to signals from outside sources. The torque is transferred through the gears 61 and 63 to the specimens, and the gears are coupled to the shafts and loaded through the hydraulic actuators.

It is possible for the vanes of one of the actuators 42 or 66 to drift from a centered position so that while the proper total torque may be carried, the vanes of one of the actuators may bottom out so that the vanes 44 and 45 were contacting. In order to eliminate this potential problem, suitable angle transducers are placed on each of the shafts 35 and 38 to sense the angular shift between the outer housings of the torque actuators and the respective shafts with respect to a reference point. For example, an angle sensor 70 is positioned on shaft 35, and comprises two parts, one of which goes along with shaft 35 and the other which travels with the housing 42. This is merely a potentiometer that changes resistance with a change of angle from a reference position. Suitable slip rings can be used to take the signal off the shaft 35. The slip rings are shown schematically at 71 and connections to the slip ring can pass through drilled openings in the shaft 35 itself. The sensor 70 could also be a synchro-type angle sensor if desired. Likewise an angle sensor 72 is positioned on the shaft 38 to sense the angle between the shaft 38 and the housing of the actuator 66 from a reference point and a slip ring assembly 73 can be utilized for transferring the signal from the rotating shafts.

The test unit can be controlled as shown schematically in FIG. 4. A torque program from a master control is indicated generally at 80, and the command signal from this torque program can be fed into an error signal amplifier shown as a summing junction 81 which receives a signal that is proportional to an average of the total signals from both the torque cells 36 and 39, which give out their signals into a amplifier 82 that gives an output signal indicating the average of the two torque cell signals. A loop gain amplifier 83 is to provide the gain for the differential signal between the programmed torque and the actual torque as measured by the two load cells which forms the control signal for the system. This signal is sent to suitable amplifiers 84 and 85 that drive the respective servo valves 57 and 68 to change the torque on the respective shafts by operating the actuators 42 and 46 in order to raise the torque level as desired. It should be noted that both actuators 42 and 46 are operated simultaneously, so that the torque level will be changed by operating both actuators a preselected amount. The angle or position signals from the transducers 70 and 71 which are represented by boxes in the control schematic, are used to feed in separate signals into the lines for controlling the servo valves if there is any difference. As shown, one of the angle sensors feeds a plus signal into amplifiers 86 and 87 and the other angle sensor 71 feeds an opposite signal in to amplifier 86. The amplifier 86 is an averaging amplifier ($K=\frac{1}{2}$) so that the gain is equal to ½. Any signal coming from amplifier 86 is fed back to the servo valve controls so that the angle valves are adjusted for equalization of deflection. The amplifier 86 will put out a zero signal when the position angles of the actuators are equal. If the actuators deflect any from equal position a signal will appear at the summing junctions 88 and 89 to raise or lower the flow signals through the servo valves sufficiently to cause equal angles of deflection of the rotary actuators. The angle equalization signal adds to or subtracts from the signal from amplifier 83. One of the summing junctions 88 or 89 is a phase inverter for the angle equalization signal in order to obtain proper operation of the servo valves for angle equalization. The amplifier 87 gives a signal that indicates total specimen deflection at a readout or indicator 90. Total angle deflection is used for determining when the specimens have reached their yield point. Synchro mechanisms can also be used for angle equalization.

Thus, for a given torque program, if the unit is operating, and drive motor 32 is rotating the specimens, a stepped input of torque can be made by having the servo valves 57 and 68 actuated to increase the torque being carried by each of the shafts 35 and 38, which torque will be transmitted to the specimens connected thereto without going through the gears 20 and 21. This eliminates the inertial effect of the gears 20 and 21, and makes instantaneous torque changes in the specimen sets 11, 12 and 24, 25 possible without inducing resonance or inertia loads. The torque changes are not through the mass of the gears from one specimen set to the other. The system makes precise control of the torque program much more simple, and increases the frequency at which torque can be changed without having a resonance excitation of the overall system. This makes it possible to more closely duplicate actual field loads on the specimens being tested.

The torque program can come as a stepped input increase in torque or can be a varying torque program that quickly changes the torque as desired. The control system of course is utilized in many different control sequences, and operates using conventional components for obtaining the results desired.

What is claimed is:

1. A test stand device comprising means for testing at least two rotating specimens dynamically, first means mechanically connecting first ends of said specimens for rotation simultaneously with respect to each other while each specimen is under torque, second means mechanically connecting the second ends of said specimens for rotation simultaneously, drive means to rotate said specimens, said second means including rotating torque transmitting members, means coupling said specimens to the rotating torque transmitting members, said coupling means comprising actuators to control torque level between said specimens and said rotating torque transmitting members and including means for substantially simultaneously adjusting the actuators to change the torque carried by each of said specimens without transmitting the torque change through said first means from one specimen to the other.

2. The combination as specified in claim 1 wherein said actuator means comprise fluid pressure actuator means, servo valve means to control the level of torque transmitted by said fluid pressure actuator means, and load cell means sensing the torque level of said specimens to provide a control signal for said servo valve means.

3. The combination as specified in claim 1 wherein said first means comprises a pair of gears drivably connected together to transmit torque between the first ends of said specimens.

4. The combination as specified in claim 1 wherein there are four specimens comprising four shafts, and wherein said shafts are coupled in pairs end to end to form two pairs of shafts with each pair comprising two shafts in series, and wherein said first means and second means are connected between the pairs of shafts.

5. A test stand device comprising means for simultaneously changing the torque in a four square test system without subjecting the test specimens to inertial loads from the connecting drive means comprising at least one pair of specimens arranged in substantially side by side relationship, first mechanical torque transmitting drive means drivably connecting first ends of said specimens, second torque transmitting drive means drivably connecting second ends of said specimens, said second torque transmitting drive means comprising a pair of rotating drive members drivably coupled together and separate fluid pressure actuator means connected between each of said specimens and said drive members, said fluid pressure actuator means being operably connected to transmit torque between said specimens and said drive members, servo valve means to control said fluid pressure actuator means whereby changes in torque in the specimens can be made through said fluid pressure actuator means substantially simultaneously to each of said specimens without being transmitted from one specimen to the other through said first mechanical torque transmitting drive means, and means to rotate said specimens.

6. The combination as specified in claim 5 wherein each of said fluid pressure actuator means comprise rotary actuators, said rotary actuators having first and second elements, one of said elements being connected to the actuator's associated specimen and the other said elements being connected to its associated drive member, sensing means to determine the angle between said first and second elements relative to a reference position, and control means to provide equal relative deflection of said first and second elements of each of said fluid pressure actuators relative the reference position.

7. The combination as specified in claim 5 wherein said fluid pressure actuators comprise servo valve actuated hydraulic rotary actuators.

8. The combination as specified in claim 7 and hydraulic coupling means for transmitting hydraulic fluid under pressure to said actuators while said specimens are rotating.

9. The combination as specified in claim 5 wherein said first torque transmitting drive means comprise spur gear members drivably engaging each other, and connected to the respective specimens.

10. The combination as specified in claim 9 and load cell means in each of said shaft means, and said load cell means being coupled to provide a signal proportional to the torque transmitted by each of the said specimens, and means to control the torque transmitted by each of said fluid pressure actuator means in response to signals from said load cell means.

11. The combination as specified in claim 10 and control means responsive to said load cell means to maintain the force transmitted by said fluid pressure actuator means at a preselected level.

12. In a four square specimen testing device comprising a plurality of test specimens to be subjected to torque arranged in a series-parallel system comprising two sets of specimens, a set of first gear drive means between first ends of said specimens, power means to rotate said specimens, wherein the improvement comprises means to transmit torque between second ends of said test specimens comprising rotating torque transmitting drive means and separate rotary hydraulic actuators connected to each of the sets of specimens and being separately and simultaneously actuable, said hydraulic actuators each including first and second elements, means to introduce fluid pressure into said hydraulic actuators while said specimens are rotating, a first of said elements of each of said hydraulic actuators being connected to one respective set of specimens and a second element of each of said hydraulic actuators being connected to the torque transmitting drive means for its associated set of specimens, and means to determine the amount of torque being carried by each of said sets of specimens, means controlling said hydraulic actuators to be operable to introduce torque changes into each of the sets of the specimens independently of the said drive connection at the first ends from fluid pressure acting between the first and second elements of that actuator.

* * * * *